United States Patent [19]

Bertini

[11] 4,160,397
[45] Jul. 10, 1979

[54] SAW BLADE CONSTRUCTION AND METHOD OF MAKING SAME

[76] Inventor: Milo Bertini, 679 Garden St., Trumbull, Conn. 06611

[21] Appl. No.: 842,618

[22] Filed: Oct. 17, 1977

[51] Int. Cl.² .................................................. B27B 33/06
[52] U.S. Cl. ........................................ 83/661; 83/835; 125/18; 30/380; 76/112
[58] Field of Search ................. 83/820, 794, 661, 651, 83/847, 835; 30/380; 76/112; 125/18, 21

[56] References Cited

U.S. PATENT DOCUMENTS

| 1,503,310 | 7/1924 | Ericson | 76/112 |
| 1,850,478 | 3/1932 | Schaefer | 83/847 |
| 4,023,448 | 5/1977 | Bertini | 76/112 |

FOREIGN PATENT DOCUMENTS 3536 of 1898 United Kingdom ...................... 83/846

Primary Examiner—Harold D. Whitehead
Assistant Examiner—Boscoe V. Parker
Attorney, Agent, or Firm—Arthur T. Fattibene

[57] ABSTRACT

A saw blade construction and method of forming such blade whereby the ends of a saw blade are abutted into end to end relationship to define an endless saw blade having a series of teeth formed along one edge to define a cutting edge, and having a back edge which is progressively sloped or tapered in opposite directions from an intermediate point on the back edge so that in a cutting operation the saw blade effects a cut along an edge portion of a workpiece on the down feed stroke of the blade and a progressive cut on the opposite edge of the workpiece whereby the teeth are rendered self-feeding on the progressive cut of the workpiece. In a modified embodiment the saw blade is formed with a plurality of alternate disposed down feed and progressive cutting edges.

10 Claims, 14 Drawing Figures

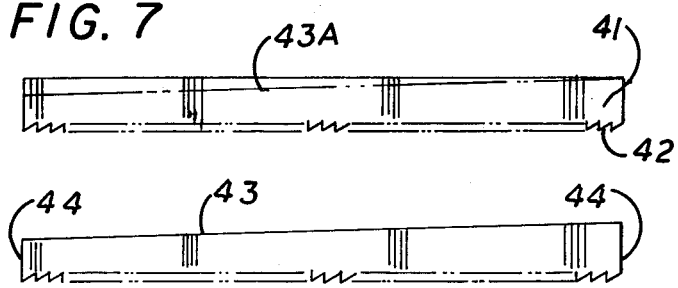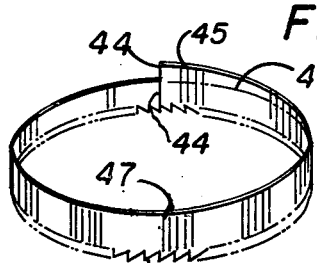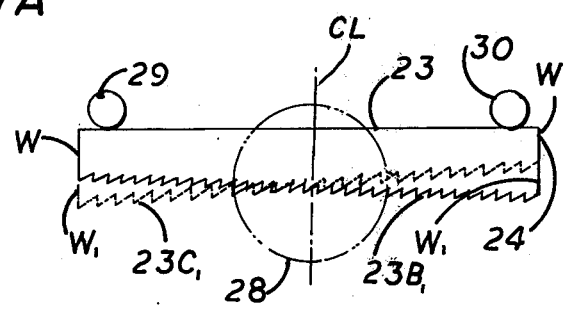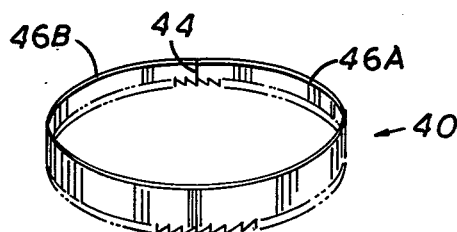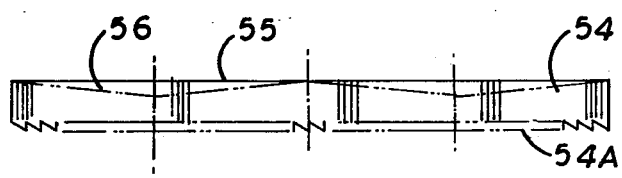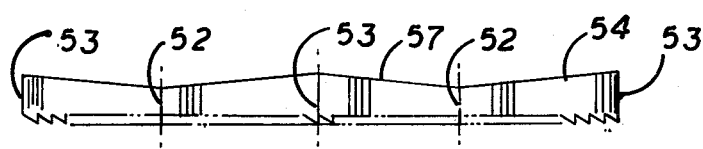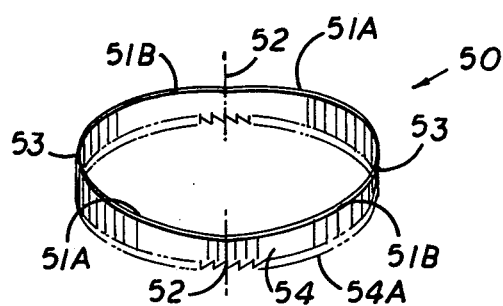

SAW BLADE CONSTRUCTION AND METHOD OF MAKING SAME

PROBLEM AND PRIOR ART

Heretofore, saw blades, e.g., endless band or saw blades were formed with cutting teeth generally disposed parallel to the back edge of the blade, and which teeth effected a cut by scratching rather than by effecting a progressive cut. Such blades required a considerable amount of cutting pressure to be applied to the blade. Such pressure was detrimental to the blade as it frequently caused the blade to be twisted and/or distorted. Such twisting or distortion during a cutting operation also adversely affected the accuracy of the cut.

In an effort to overcome these apparent defficiencies, I have caused to be patented a method of producing a stepped saw blade as disclosed in my U.S. Pat. No. 4,023,448 granted May 17, 1977. While the saw blade construction in accordance with the method of said U.S. Pat. No. 4,023,448 constitutes a substantial advance in the art, the present invention to be herein described constitutes a further advance in the art of saw blade constructions and method of forming same.

OBJECTS

An object of this invention resides in the provision of a saw blade construction and method of forming such blade in which the respective teeth over a portion of a cutting edge during a cutting operation are progressively fed relative to a workpiece during a cutting operation, and whereby another portion of the cutting edge effects a cutting operation on the down feed stroke of the blade.

Another object is to provide an improved saw blade construction and method of making same which is relatively simple, inexpensive, and positive in operation.

Another object is to provide an endless band saw construction wherein the back edge of the blade is tapered or progressively sloped outwardly relative to the cutting edge in opposite direction from an intermediate point.

Another object is to provide an endless saw blade construction having a plurality of connected segments having sloped or tapered back edge extending in opposite direction from a series of spaced apart intermediate points.

Another object is to provide an endless saw blade construction having an oppositely tapered back portion whereby the cutting edge is sloped during a cutting operation to effect a cut on the down feed side of the saw blade and a progessive cut on the cutting stroke of the blade.

SUMMARY OF THE INVENTION

The foregoing objects and other features and advantages are obtained by a saw blade construction which comprises a saw blade having a series of cutting teeth disposed along an edge thereof to define a cutting edge. The opposed ends of a blade of a predetermined length are disposed in end to end relationship and secured to define an endless blade. The back of the blade is shaped so as to taper outwardly in opposite direction from an intermediate point. The arrangement is such that during a cutting operation, a portion of the blade effects a cut on a workpiece during the down feed stroke of the blade, and another portion of the blade effects a progressive cut whereby the cutting teeth are progressively fed during the cutting operation. Thus the blade construction is such that a "see-saw type" cutting action is effected on the workpiece which will greatly enhance the cutting operation.

The method for fabricating a saw blade embodying the present invention comprises of forming a series of cutting teeth along a predetermined length of a blade stock. Thereafter, the back edge of the blade is cut or shaped with oppositely disposed tapers extending from an intermediate point on the back edge of the blade. The opposed ends of the blade are then joined to define an endless band blade having a minimum width and a spaced apart maximum width, whereby the back edge of the blade is sloped relative to the cutting edge. An alternate method is to join the ends of the predetermined length of the saw blade together and thereafter shape or cut the back edge to slope the back edge relative to the cutting edge. Still another method can comprise tapering the back edge of the blade from one end to the other, then joining the opposed ends whereby the back edge is stepped, and thereafter cut, grind or remove the stepped portion of the back edge to finish the blade construction.

FEATURES

A feature of this invention resides in an improved method of fabricating an endless saw blade which is capable of greatly enhancing the cutting operation and the accuracy of the cutting operation.

Another feature resides in an improved saw blade construction of the endless band type where the blade effects a progressive cut on the workpiece on one side thereof, and a down feed cut on the other side of the workpiece to result in a continuous see-saw type cutting action on the workpiece.

Another feature resides in an endless band saw blade construction wherein the cutting action is effected with a continuous see-saw type cutting action in which the cutting teeth are progressively presented to the workpiece on the non feed cycle of the cutting stroke.

Other features and advantages will become more readily apparent when considered in view of the drawings and specification in which.

Figure 4:
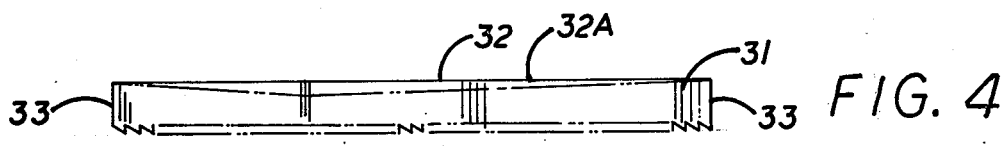
Figure 5:
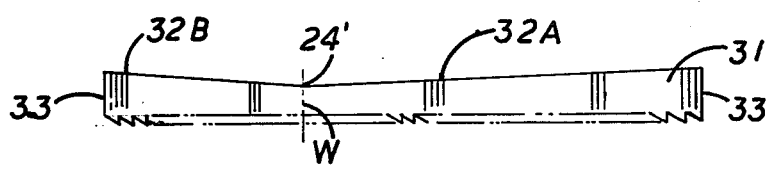
Figure 6:
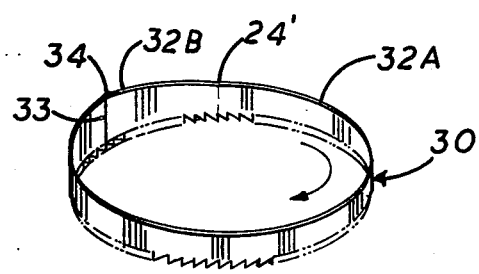

FIGS. 4, 5 and 6 are respective views corresponding to views 1, 2 and 3 respectively of a modified blade construction.

FIGS. 7, 7A, 8 and 9 are respective views illustrating the steps and construction of a modified saw construction.

FIGS. 10, 11 and 12 are views corresponding to views 1, 2 and 3 respectively of still another modified blade construction.

FIG. 13 is a diagrammatic view to illustrate the see-saw cutting action on a workpiece of an endless blade embodying the present invention.

DETAILED SPECIFICATION

Figure 1:
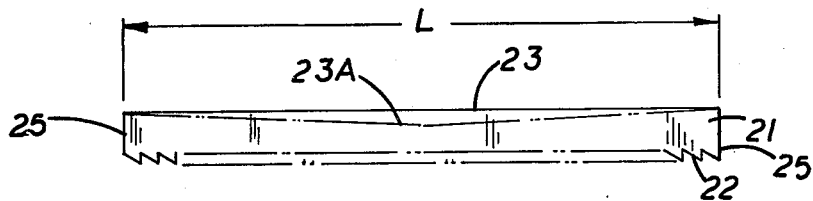
FIG. 1 is a side view of a saw blade stock.
Figure 3:
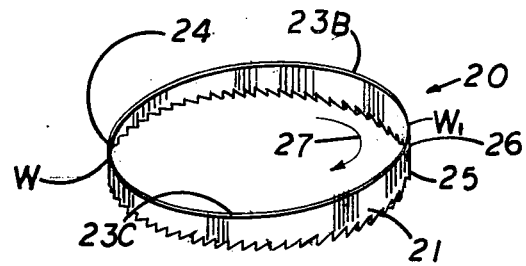
FIG. 3 is a perspective view of an endless saw blade embodying the present invention.

Referring to the drawings, there is shown in FIG. 3 an improved endless band or saw blade 20 embodying the present invention. The saw blade 20 is defined by an elongated member or saw blade stock 21. As best seen in FIG. 1, the saw blade stock 21 has a series of cutting teeth 22 formed along one edge to define the cutting edge. It will be understood that the teeth 22 formed along the cutting edge are constructed according to well known technology. The edge opposite the cutting edge defines a back edge 23 which is generally parallel to the cutting teeth edge. It will be also understood that the blade length L may be of any predetermined length.

Figure 2:
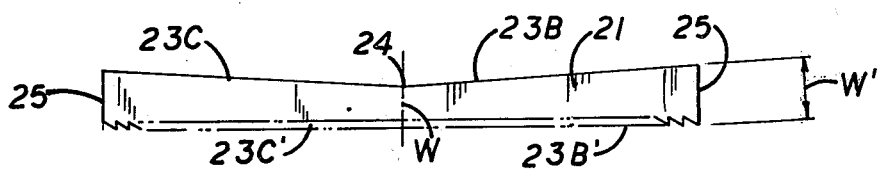
FIG. 2 is a side view of a saw blade showing an intermediate step.

According to this invention, the back edge 23 of the blade is shaped by cutting or grinding along the dash lines 23A as shown in FIG. 1 to define a blade configuration as indicated in FIG. 2.

The back edge of the blade 21 after being shaped defines oppositely disposed inclined or tapered edge portions 23B and 23C which extend outwardly from an intermediate point 24 on the back edge 23. In the form of the invention shown in FIGS. 1 to 3, the intermediate point 24 is located midway between the opposed end portions 25—25 of blade 21. Referring to FIG. 2, it will be noted that the back edge portions 23B, 23C taper outwardly and incline relative to its corresponding cutting edge portions $23B^1$ and $23C^1$. Thus the transverse width W of the blade at the intermediate point defines the minimal width or transverse section of the blade 21. The opposed end portion 25 define the maximum transverse width $W^1$.

With blade stock 21 so formed, the endless blade 20, as shown in FIG. 3, is formed by bringing the opposed end portions 25—25 together and joined as by welding or other suitable bonding technique as indicated at 26. Upon completion of the endless band saw blade 20 as shown in FIG. 3, it will be noted that proceeding clockwise as indicated by arrow 27, the cross sectional width of the blade progressively increases in going from W or point 24 to $W_1$ or joint 26. From joint 26 or $W_1$ to point 24 or W the cross section width of the blade 20 progressively diminishes.

With the construction described and the method defined for the assembly of blade 20, it has been discovered that in a cutting operation blade 20 will effect a see-saw type cutting action on a workpiece 28. Referring to FIG. 13, the endless band 20 is disposed in a sawing machine, not shown, so that the blade 20 is fed vertically toward the workpiece 28. At the cutting station on opposite sides of the workpiece, the back edge of the blade is disposed in engagement with a pair of spaced pressure rollers 29 and 30. One roller, e.g., roller 29, functions as the blade down feed roller, and which roller exerts a pressure on the blade 20 during the down feed cutting stroke. Thus on the down stroke, the pressure of rollers 29 and 30 is such that the cutting is being effected to the left of the centerline CL of the workpiece 28 by cutting portion $23C^1$ of blade 20. As point 24 or minimal width W passes the centerline CL of the workpiece, the cutting edge portion $23B^1$ effects a progressive cutting action on the workpiece 28 to the right of the centerline CL as viewed in FIG. 13.

The arrangement is such that the pressure rollers 29 and 30 applies a force on the blade which tends to render the tapered back edge of the blade 20 coincidental thus disposing the cutting edge portions $23B^1$ and $23C^1$ at an angle relative to the back edge. It will be understood that the degree of taper formed along the back edge as shown in FIGS. 1 and 2 will vary in accordance to a desired cutting operation or material to be cut.

With the blade construction described and the manner in which it functions, it will be noted that on the feed stroke, edge portion $23C^1$ is effecting a cutting action on one side of the workpiece whereby the teeth are not progressively fed during this portion of the cutting operation, and thereafter, the cutting stroke is effected or followed by blade portion $23B^1$ whereby the cutting teeth are progressively rendered self-feeding over this portion of the cut. Thus the arrangement is such that the cut is effected by a back and forth or see-saw type of cutting action on the workpiece 28.

FIGS. 4, 5 and 6 illustrate a modified blade construction and method of forming an endless blade of the type embodying this invention. In this form of the invention, the blade construction 30 and method of forming the same is similar to that hereinbefore described except that the minimal width or point $24^1$ is located at a point other than the midpoint of blade 31. Thus as shown in FIGS. 4 and 5, the length of taper formed along the back edge 32 of blade 31 are of unequal length, e.g., 32A and 32B whereby 32A is longer than 32B. When the opposed ends 33—33 are joined as at 34, the arrangement is such that the down feed of the cutting stroke is effected over the distance defined by the short taper 32B, and the progressive cut is effected over the longer edge 32A. In all other respects the operation of the blade construction of FIG. 6 is similar to that hereinbefore described. Also the manner in which blade 31 operates is similar as described with respect to FIG. 13, except that the down feed of the blade 31 is effected over the length of the short taper 32B, and the progressive cut is effected over the length of the longer taper 32A.

FIGS. 7, 7A, 8 and 9 illustrate the various constructional steps to illustrate another method of making an endless band saw 40 embodying the invention. In this form of the invention, a blade stock 41 is formed with a series of cutting teeth 42 to define a cutting edge along the length thereof. The back edge 43 is cut or shaped along a cutting line 43A on blade 40 so as to define a longitudinal taper back edge 43 extending from end to end 44—44.

As shown in FIG. 8, the opposed ends 44, 44 are then joined to one another in a suitable manner to define an endless blade 40. The ends 44—44 are joined so that the teeth define a circular or coincidental bottom cutting edge. With the endless blade formed as shown in FIG. 8, the back edge portion 45 is removed along a cutting line or plane 46 in an outwardly or progressively tapered manner to an intermediate point, e.g., 47. Upon effecting the removal of the portion 45 along cutline 46 as described, an endless blade construction as shown in FIG. 9 is produced. In the finished form, the abutted end portions 44 define the minimal transverse section of the blade, and the transverse section at point 47 defines the maximal transverse section. Thus, a blade 40 having opposed outwardly tapered back edge portions 46A, 46B from point 44 is formed. The blade 40 formed by the method described is structurally similar to that described with respect to FIGS. 1 to 3. However, as described in FIGS. 4, 5, and 6, the intermediate point 47 of blade 40 may be located at any desired intermediate point along the length of the blade so as to vary the length of the respective down feed cut and progressive cut as hereinbefore described.

FIGS. 10, 11 and 12 illustrate a further embodiment and method for forming such embodiment. As best seen in FIG. 12 the endless band saw 50 has a plurality of opposed tapered or sloping back edge portions, e.g., 51A, 51B, to define more than one minimal transverse section 52—52 and maximal transverse sections 53, 53.

Referring to FIG. 10, the saw blade stock member 54 is formed with cutting teeth 54A in a well known manner. The back edge portion 55 is then cut or shaped along a cutting line 56 to define a back edge 57 as shown in FIG. 11. Thus the stock member 54 is formed with alternate minimal and maximum transverse sections as indicated at 52 and 53. The opposed ends 53 are then joined to define the endless band saw blade as shown in FIG. 12.

The band saw blade of FIG. 12 is thus constructed to define a multiple down feed cutting portion and a multiple progressive cutting portion per each revolution of the blade 50. In operation, the blade 50 of FIG. 12 operates in a manner hereinbefore described with respect to FIG. 13, except that upon each revolution of blade 50, a multiple down feed cut and progressive cut is made.

From the foregoing, it will be apparent that the improved band saw blade and method of forming the same results in a saw blade which can effect a quick and efficient cut with a minimum of power and with a maximum of accuracy. It will be noted that each blade construction, as described, operates with a down feed cut occuring to one side of a workpiece and with an alternate progressive cut on the other side of the workpiece. In so doing, the cutting operation is rendered more efficient than the conventionally known cutting methods. Also by locating the minimal transverse section relative to an end portion of a blade member, as best seen in FIGS. 2 and 4, the length of the progressive cut can be varied depending upon the material to be worked upon.

While the foregoing invention has been described with respect to several saw blade embodiments and methods of forming the same, it will be understood and appreciated that variations and modifications can be made without departing from the spirit or scope of the invention.

What is claimed is:

1. A method for making an endless band saw blade comprising the steps of:
    forming a blade stock with a plurality of cutting teeth to define a cutting edge,
    shaping the back edge of said blade opposite said cutting teeth whereby said back edge is inclined in opposite directions relative to said cutting edge from an intermediate point on said back edge,
    and connecting the opposed edges of said blade in abutting end to end relationship to define an endless band saw blade wherein the back edge of said blade progressively diverge relative to said cutting teeth in opposite direction from said intermediate point.

2. A method as defined in claim 1 wherein said shaping comprises tapering said back edge progressively from said intermediate point outwardly toward the opposed ends thereof.

3. A method as defined in claim 1 wherein said shaping comprises the step of tapering said back edge outwardly from said intermediate point progressively out to the opposed ends of said blade whereby said intermediate point defines the minimum width of saw blade and said end points define substantially equal maximum width end portions of saw blade.

4. A method as defined in claim 3 wherein said shaping of said back edge outwardly from said intermediate point comprises a taper of substantially uniform length.

5. A method as defined in claim 3 wherein said taper back edge from said intermediate point are of unequal length.

6. A method as defined in claim 3 wherein said shaping of said back edge comprises the tapering of said back edge outwardly from a plurality of spaced apart intermediate points so as to define an endless blade having a plurality of spaced minimum and maximum widths.

7. An endless saw blade comprising:
    a blade having a plurality of teeth along one edge to define a cutting edge, and
    a back edge,
    said back edge being tapered in opposite directions from an intermediate point in said back edge whereby said blade is defined with a minimum transverse width and a maximum transverse width,
    said oppositely tapered back edge being sloped to diverge outwardly relative to said cutting edge.

8. An endless saw blade as defined in claim 7 wherein said endless saw blade includes a plurality of spaced apart minimum and maximum transverse widths, and
    said back edge being tapered in opposite directions from said minimum width to said maximum width.

9. An endless saw blade as defined in claim 8 wherein said minimum and maximum widths are equidistantly spaced about said endless blade.

10. An endless saw blade as defined in claim 8 wherein said minimum and maximum width are variably spaced about said endless blade.

* * * * *